Dec. 17, 1957 B. WIER Re. 24,406

VALVE COUPLING

Original Filed Feb. 14, 1955

BERT WIER,
INVENTOR.

BY

William C. Babcock
ATTORNEY.

United States Patent Office

Re. 24,406
Reissued Dec. 17, 1957

24,406

VALVE COUPLING

Bert Wier, Chino, Calif.

Original No. 2,799,517, dated July 16, 1957, Serial No. 487,840, February 14, 1955. Application for reissue August 26, 1957, Serial No. 680,902

6 Claims. (Cl. 284—17)

Matter enclosed in heavy brackets [ ] appears in the original patent but forms no part of this reissue specification; matter printed in italics indicates the additions made by reissue.

This invention relates generally to quick-coupling valves, and more particularly to such valves as they are utilized in dairy operations in milk collecting systems.

Valves of this type are widely used in all fluid handling systems although they are particularly adapted for use in such systems wherein sanitation is a primary consideration, as for instance, foodstuffs. As is well-known, milk is particularly prone to spoliation and therefore all equipment designed for its handling must be designed with sanitation as the primary design consideration. Prior milk collecting systems operating without the benefit of this device have delivered the milk from the milking machine to the header line through manually operated valves or through couplings of types not readily accessible for cleaning. Consequently, it is a major objective of this invention to provide a valve of such design that all parts thereof which come into contact with the milk are readily accessible for cleaning.

It is another object of this invention to provied a valve which is easily and quickly coupled to a header line merely by the act of plugging it in, thus eliminating the manual opening and closing of valves.

Furthermore, this invention will provide a valve of the described character which is capable of positive mechanical engagement with the header line, the coupling being of such design that there is no possibility of disconnection even though the pressure differential between header line and milking machine should fail.

Another object of the invention is to provide a valve of such design that the passage therethrough is completely unobstructed and of such contour that the flow of fluid through said valve and into the header line is accomplished with a minimum of turbulence. Obviously, such a passageway also offers no crevices in which fluid or foreign matter can collect.

These and other objects and advantages of the invention will become apparent from the following description of a preferred form thereof, and from the drawing illustrating that form, in which.

Figure 1:
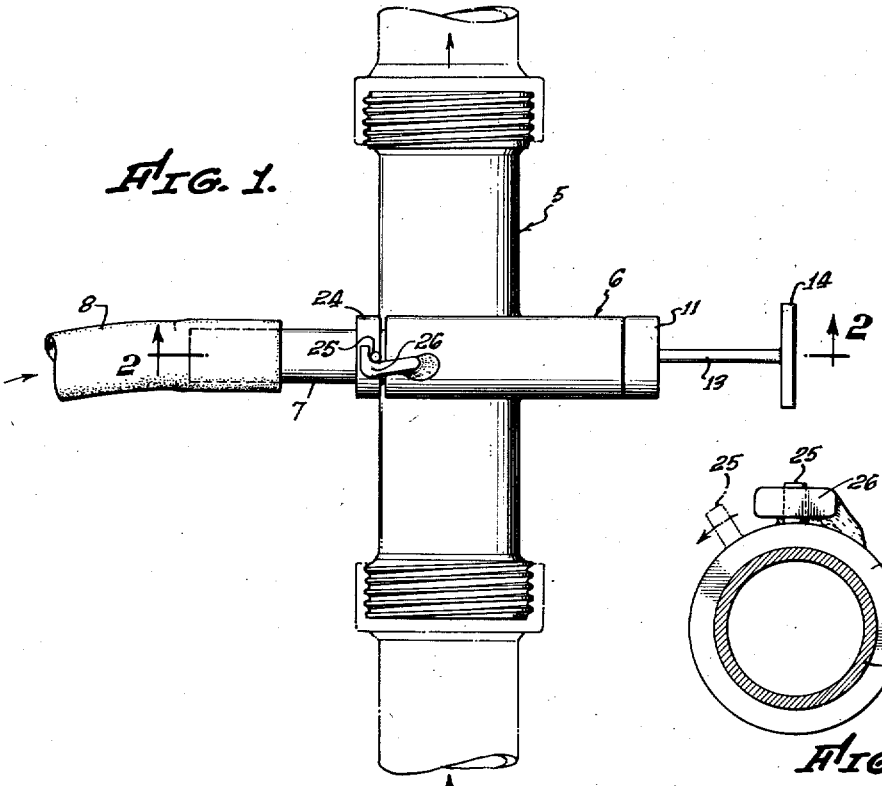
Figure 1 is a plan view of the invention in its connected position.

As may be seen from the drawing, the gathering system incorporates a header line 5 which extends throughout the barn over the stalls, and which carries milk to a reservoir, not shown. Rigidly affixed to said line 5, by welding or other means, is a transversely disposed valve body 6, adapted to detachably receive the nozzle 7, which nozzle is ported to communicate with the interior of the header line 5. A flexible hose 8 is affixed to the nozzle 7 leading thereto from a milking machine, not shown. The flow of fluid through the system is designated by the arrows in Figure 1 and Figure 2.

Figure 2:
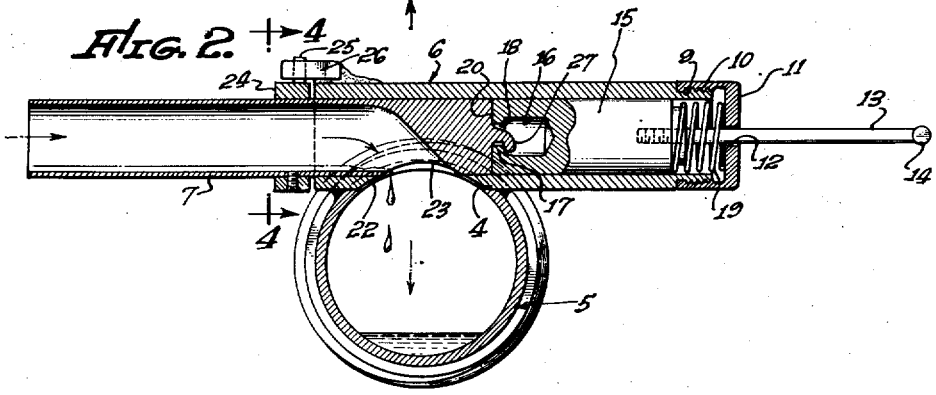
Figure 2 is a cross-section of the device taken along the line 2—2 of Fig. 1.

Referring now to Figure 2 it may be seen that the valve body 6 is a hollow cylindrical shell open at one end thereof and of such an inside diameter as to slidably receive the nozzle 7. The other end of said valve body 6, has thread means 9, formed on the outside diameter of said valve body 6, adapted to engage thread means 10 formed on the inside diameter of a cap 11, which is screwed onto said valve body 6. On the nozzle side of said valve body 6 at the open end thereof is rigidly affixed a hook 26, extending beyond said open end.

A bore 12 is formed in the cap 11 at the center thereof and adapted to slidably receive a rod 13, which at its outer or exterior end, has rigidly affixed thereto stop means 14, which means consist of a rod which is transversely disposed relative to rod 13. At the other or interior end of said rod 13 and rigidly affixed thereto is a movable sealing means or piston 15, being a substantially solid body of such a diameter as to allow it to slidably reciprocate within said valve body 6. Within said piston, at the end thereof opposite to its connection to said rod 13, is formed a bore 16 which has an internal annular shoulder 17, thus forming an eye 18. Also within said valve body 6 is a helical spring 19 disposed intermediate said piston 15 and cap 11 which spring at all times urges piston 15 towards the open end of the valve body 6. The travel of said piston 15 under urging of said spring 19 is limited by stop means 14, which means are so located as to stop piston 15 when its exterior face 20 is aligned flush with the open end of valve body 6, as may be seen in Figure 3.

To the end of the flexible hose 8 which leads from the milking machine is affixed nozzle 7 which is closed at one end, the other end thereof having an opening therein in communication with the interior of said hose 8. Said opening continues through said nozzle 7 to a port 23 formed in the side of said nozzle 7. As is shown in Figure 2, when the valve is in the open position, said port 23 is in alignment with a port 22 formed on the valve body 6, which port 22 mates with port 21 formed on the upper portion of header line 5, thus forming a passageway which offers no obstruction to the flow of fluids. Detachably fixed to said nozzle 7 is a collar 24 which on the upper side thereof has a pin 25 formed thereon. At the center of the closed end of the nozzle 7 is formed an L-shaped catch 27 which is adapted to enter eye 18 and engage annular shoulder 17.

Figure 3:
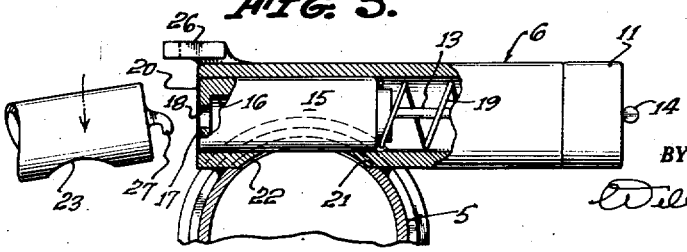
Figure 3 is a transverse view, partly in cross-section and showing the device with the valve closed and uncoupled.

The device in the closed position may be seen in Figure 3. It will be noted that port 22, to the interior of header line 5 is closed by piston 15 which is yieldably retained in the closed position by the action of spring 19 against cap 11. In order to open the valve, nozzle 7 is placed proximate face 20 of piston 15 so that the longitudinal axis of said nozzle 7 is inclined from the normal relative to said face 20 in order that the end of catch 27 may pass through eye 18. Catch 27 is then inserted through eye 18 and nozzle 7 is then pressed against piston 15, compressing spring 19, the nozzle 7 thus entering valve body 6. The nozzle 7 is urged into said valve body 6 until pin 25 is in position to engage hook 26, at which time the nozzle 7 is rotated clockwise, hook 26 thus engaging pin 25. Nozzle 7 is then released and spring 19 then immediately urges piston 15 and nozzle 7 outwardly, but as this presses pin 25 against hook 26, nozzle 7 is thereby retained in valve body 6. It will be seen from Figure 2 that collar 24 is located at just such a distance from the closed end of nozzle 7 as will allow the port 23 of nozzle 7 to align perfectly with the port 22 of the valve body 6 when the action of spring 19 is holding pin 25 against hook 26. Thus, the valve is open and a clean unobstructed passage is offered between the milking machine and header line.

Figure 4:
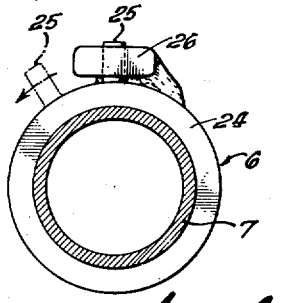
Figure 4 is an end view of the device in coupled position showing the locking and positioning means while that portion of the figure in phantom line represents the counter-clockwise rotation of the nozzle in order to disconnect it.

In order to close the valve, the nozzle 7 is urged inwardly and in a counter-clockwise direction, as shown in Figure 4. The pin 25 is then clear of the hook 26 and the spring 19 thereupon urges piston 15 and nozzle 7 outwardly until stop 14 engages cap 11. Nozzle 7 may then be disconnected by withdrawing catch 27 from eye 18.

Although the valve herein described is fully capable of achieving the objects and providing the advantages hereinbefore mentioned, it is to be understood that it is merely illustrative of the presently preferred embodiment of the invention and that the applicant does not wish to limit himself to the details of construction herein described other than as defined in the appended claims.

I claim:

1. A quick-coupling valve that provides an unobstructed passage between a flexible hose and a liquid collection line consisting of: a horizontally disposed header member that is formed of a cylindrical shell having a first port formed in the upper side thereof; a tubular valve body having a second port formed in the lower side thereof, said body being transversely rigidly mounted on said member so that said first port and said second port are in alignment; a cap having a bore therein rigidly affixed to one end of said body; a piston slidably mounted within said body, said piston having an outer face which is normally disposed flush with the open end of said body, said outer face having a recess formed therein, which recess provides an inwardly disposed annular shoulder, a helical spring mounted within said body intermediate said piston and said cap which spring constantly urges said piston towards the open end of said body; a first rod slidably inserted through the bore in said cap, said rod being connected to said piston; a second rod rigidly mounted on the outer end of said first rod transversely thereto, said second rod being spaced outwardly along said first rod from the inner face of said piston so that as said second rod contacts the outer face of said cap, said spring is prevented from urging the outer face of said piston beyond the open end of said body in which position said piston closes said ports; a hook rigidly affixed to the upper side of said body, the arm of said hook extending beyond the open end of said body; a cylindrical nozzle adapted to slidably enter the open end of said body, said nozzle having a passage therethrough which commences at one end of said nozzle and terminates in a third port on the side of said nozzle, the other end of said nozzle having an L-shaped catch formed thereon which catch is adapted to engage said annular shoulder in order to prevent inadvertent dislodgement of said nozzle from said piston; and, a collar rigidly affixed to said nozzle, said collar having a radially extending pin formed thereon, said collar and said pin being spaced such a distance from the closed end of said nozzle that when said nozzle is inserted within said body displacing said piston, said spring being compressed, said nozzle may be rotated to move said pin into engagement with said hook, whereby said spring, hook, pin and collar combine to hold said nozzle in such position that said third port is substantially co-terminous with said first port and said second port.

2. A quick-coupling valve that provides an unobstructed passage between a flexible hose and a liquid collection line, consisting of: a horizontally disposed header member that is formed of a cylindrical shell having a first port formed in the upper side thereof; a tubular valve body that is closed at one end transversely rigidly mounted on the upper side of said header and having a second port formed on the lower side thereof that opens into the interior of said header through said first port; an axially slidable piston in said valve body movable to a position adjacent the open end of said body to close said ports; spring means in said valve body between said piston and said closed end of said body to at all times urge said piston into port-closing position; stop means connected to said piston and engageable with said closed end for preventing displacement of said piston out of said open end of said body beyond a port-closing position; a nozzle having a passage therethrough terminating in a third port formed on the side thereof, which nozzle can be axially slidably inserted into said open end of said body to force said piston out of port-closing position toward said closed end of said body; and interlocking means on said nozzle and tubular valve body for releasably holding said nozzle against axial displacement from said body, which means also serves to position said nozzle with said third port thereof opening downwardly through said second port into the interior of said header.

3. A device as defined in claim 2 in which said releasable holding means consists of a hook rigidly affixed to the upper side of said body and having an arm extending outwardly beyond said open end of said body; and a pin rigidly fastened to said nozzle and extending radially outward therefrom in such a way that after insertion of said nozzle into said valve body and upon subsequent rotation thereof, said pin is moved into engagement with said hook with said third port opening downwardly into said header.

4. A device as defined in claim 3 in which said closed end is provided with a central bore and wherein said stop means consists of an elongate guide connected to and projecting axially from the inner end of said piston to be slidable through said bore formed in the center of said closed end of said body; and a second rod transversely rigidly mounted on the outer end of said first rod that is adapted to contact the outside of said closed end of said body to prevent movement of said piston out of said open end of said body.

5. A quick coupling valve for use in effecting fluid communication between a hose and a tubular header in the upper wall of which an opening is formed, including: movable sealing means disposed on the exterior of said header that is capable of sealing said opening; transversely disposed supporting means mounted on the exterior of said header that slidably supports said movable sealing means, which supporting means is formed with a passage therein communicating with said opening; rigid tubular means affixed to one end portion of said hose, having a port adapted to be aligned with said opening, said tubular means being capable of removably and movably engaging said supporting means by a push-pull operation, with said rigid tubular means when moved in a predetermined direction after initial engagement with said supporting means moving said movable sealing means out of said sealing position *and out of communication with the interior of said header* to establish fluid communication between said hose and the interior of said header by alignment of said port with said opening [means to move said sealing means into sealing position; and cooperating means on said sealing means and said rigid tubular means that prevent disengagement of said rigid tubular means from said supporting means until said sealing means has been moved into a position where it seals said opening], *and cooperating means on said sealing means and said rigid tubular means to move said sealing means into sealing position and in addition prevent disengagement of said rigid tubular means from said supporting means until said sealing means has been moved to a position where it seals said opening.*

*6. A quick coupling valve for use in effecting fluid communication between a hose and a tubular header in the side-wall of which an opening is formed, including: transversely disposed supporting means mounted on the*

*exterior of said header which supporting means is formed with a passage therein communicating with said opening; sealing means movably supported by said supporting means and capable of sealing said passage when in a sealing position; rigid tubular means affixed to one end portion of said hose, said tubular means being capable of removably and movably engaging said supporting means by a push-pull operation, with said tubular means when moved in a predetermined direction after said engagement moving said movable sealing means out of said sealing position to establish uninterrupted, direct fluid communication from said tubular means to the interior of said header through said passage only; and cooperating means on said sealing means and on said rigid tubular means which move said sealing means into said sealing position and in addition prevent disengagement of said*

*rigid tubular means from said supporting means until said sealing means has been moved to said passage sealing position.*

References Cited in the file of this patent or the original patent

UNITED STATES PATENTS

| | | |
|---|---|---|
| 1,073,719 | Timmer | Sept. 23, 1913 |
| 2,109,511 | Simon | Mar. 1, 1938 |
| 2,335,825 | Eaton et al. | Nov. 30, 1943 |
| 2,657,073 | Funk | Oct. 27, 1953 |
| 2,714,518 | Balass | Aug. 2, 1955 |
| 2,725,245 | Hein | Nov. 29, 1955 |

FOREIGN PATENTS

| | | |
|---|---|---|
| 231,061 | Great Britain | Mar. 26, 1925 |